US008387896B2

(12) United States Patent
Wanthal

(10) Patent No.: US 8,387,896 B2
(45) Date of Patent: Mar. 5, 2013

(54) SELF CLEANING NOZZLE HEADER SYSTEM

(75) Inventor: Paul David Wanthal, Bartlett, IL (US)

(73) Assignee: Spraying Systems Co., Wheaton, IL (US)

( * ) Notice: Subject to any disclaimer, the term of this patent is extended or adjusted under 35 U.S.C. 154(b) by 705 days.

(21) Appl. No.: 12/541,026

(22) Filed: Aug. 13, 2009

(65) Prior Publication Data

US 2010/0038447 A1 Feb. 18, 2010

Related U.S. Application Data

(60) Provisional application No. 61/089,254, filed on Aug. 15, 2008.

(51) Int. Cl.

| | |
|---|---|
| ***B05B 1/28*** | (2006.01) |
| ***B05B 15/02*** | (2006.01) |
| ***B05B 7/16*** | (2006.01) |
| ***F23D 11/34*** | (2006.01) |
| ***A23G 3/20*** | (2006.01) |

(52) U.S. Cl. ........ 239/112; 239/104; 239/106; 239/113; 118/17; 118/302

(58) Field of Classification Search .................. 239/104, 239/106, 112, 113, 119; 118/17, 302, 314, 118/325
See application file for complete search history.

(56) References Cited

U.S. PATENT DOCUMENTS

| | | | | |
|---|---|---|---|---|
| 5,136,972 | A * | 8/1992 | Naka et al. | 118/410 |
| 5,755,361 | A | 5/1998 | Restive et al. | |
| 6,635,134 | B1 * | 10/2003 | Lichtenberg et al. | 156/162 |
| 7,083,121 | B2 | 8/2006 | Huffman | |
| 2004/0195353 | A1 * | 10/2004 | Proulx, Jr. | 239/106 |
| 2006/0286290 | A1 * | 12/2006 | Wanthal et al. | 427/8 |

* cited by examiner

*Primary Examiner* — Ryan Reis
(74) *Attorney, Agent, or Firm* — Leydig, Voit & Mayer, Ltd.

(57) ABSTRACT

A self cleaning header assembly for use within a spray application system includes a plurality of spray guns for spraying a mix of air and liquid, e.g., an adhesive, and comprises a cleaning mechanism including one or more wash nozzles and a shroud. During a cleaning cycle, the shroud is closed and the spray guns rotate to approach the wash nozzles. The wash nozzles apply pressurized liquid, e.g., water, to the spray gun nozzles to remove excess adhesive that may affect the spray pattern and flow. After the washing cycle is complete, the spray guns are rotated to again face the target of interest and the shroud is reopened.

18 Claims, 8 Drawing Sheets

SELF CLEANING NOZZLE HEADER SYSTEM

CROSS REFERENCE TO RELATED APPLICATION

This application claims the benefit of U.S. Provisional Application No. 61/089,254, filed Aug. 15, 2008, which is incorporated herein in its entirety.

BACKGROUND

In the production of materials, it is often necessary to adhere one piece of material to another. This is very often the case in the production of sheet-like materials, wherein laminating is used to improve the physical properties or appearance of the finished product. One problem that arises in such situations is that it is necessary to apply an adhesive to one or both surfaces, and yet adhesives, by their nature tend to be, or to become, sticky and viscous, thus eventually clogging the machinery used to apply such adhesives.

Although it is possible to remove and clean or replace the affected portions of the system, this entails labor and material costs, and also results in excessive downtime of the production line. While the present invention also may entail certain costs and may result in a small amount of downtime, it very often provides a significantly more economical solution than the state of the art.

When considering this background section, the disclosure and claims herein should not be limited by the deficiencies of the prior art. In other words, the solution of those deficiencies, while desirable, is not a critical limitation of any claim except where otherwise expressly noted in that claim. Moreover, while this background section is presented as a convenience to the reader who may not be of skill in this art, it will be appreciated that this section is too brief to attempt to accurately and completely survey the prior art. The preceding background description is thus a simplified and anecdotal narrative and is not intended to replace printed references in the art. To the extent an inconsistency or omission between the demonstrated state of the printed art and the foregoing narrative exists, the foregoing narrative is not intended to cure such inconsistency or omission. Rather, applicants would defer to the demonstrated state of the printed art.

SUMMARY OF THE INVENTION

In one aspect, it is an object of the invention to provide an apparatus and method for automatically cleaning a nozzle array with minimal downtime incurred, and without requiring disassembly of the spray head or spray system.

It is a further object of the invention to provide an adhesive application system having self-cleaning spray nozzles, such that the nozzles may be cleaned without removing them and without contaminating the target.

It is yet another object of the invention to provide an apparatus and method for automatically cleaning a nozzle, wherein the actuation of a cleaning mode serves to both clean the nozzles and enclose the spray guns.

Further objects and advantages will be appreciated from the included detailed description and figures.

DETAILED DESCRIPTION OF THE INVENTION

Figure 1:
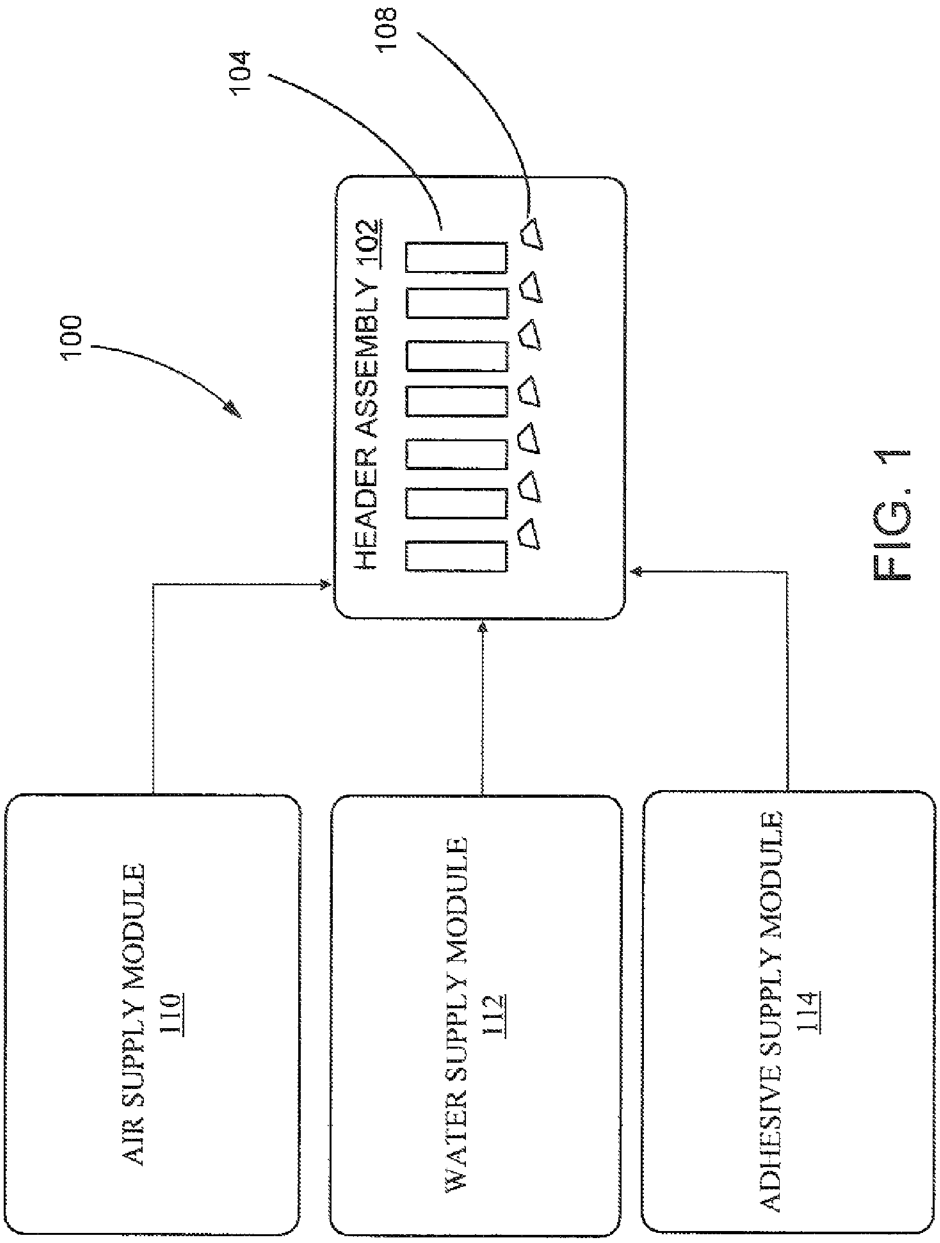
FIG. 1 is a system schematic view of a foam lamination system in accordance with an embodiment of the invention.

Turning to FIG. 1, a foam lamination system 100 is shown. The exemplary foam system 100 includes one or more self cleaning header assemblies 102 including a header housing 103, and a plurality of spray guns 104 mounted within the header housing 103 for spraying a mix of air and liquid, such as an atomized mix of air and adhesive for use in pulp and paper manufacturing. Each spray gun 104 includes an internal wash passageway for cleaning the spray gun interior. To eliminate exterior buildup, each header assembly 102 further comprises one or more external wash nozzles 108. The system further includes an air supply module 110 that supplies atomizing air and cylinder air to each of the spray guns 104 via their respective supply lines. The water supply module 112 and adhesive supply module 114 deliver water and adhesive, respectively, to the spray guns 104. The water supply module 112 also delivers water to the external wash nozzles 108 for cleaning the exterior of the spray guns 104.

Figure 2:
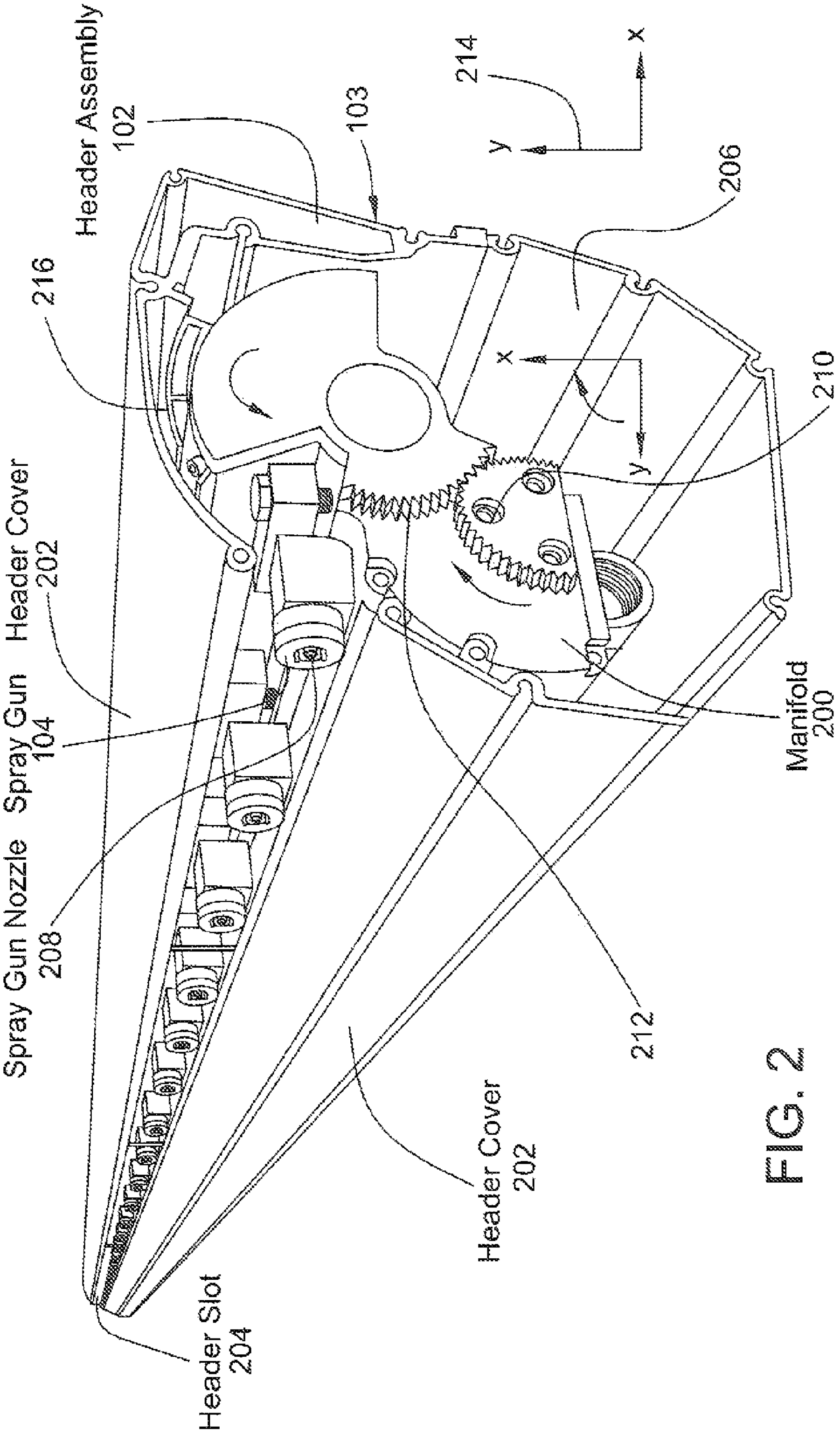
FIG. 2 is a cut away perspective end view of a self cleaning header assembly in accordance with an embodiment of the invention.

Turning to FIG. 2, an embodiment of a self cleaning header assembly 102 is shown. The header assembly 102 houses a plurality of spray guns 104 mounted to a manifold 200. In an embodiment, the spray guns 104 are plate mounted on the manifold 200 to facilitate assembly and replacement procedures. Preferably, the manifold 200 is completely enshrouded by header covers 202 of the housing 103 for protecting the spray guns 104. The spray guns 104 disperse the atomized mix of air and liquid (e.g., adhesive) via a header slot 204 when the manifold 200 is in the active position 206. Thus, when the manifold is in the active position 206, the spray guns disperse the atomized mix along the y-axis, as shown. The header slot 204 is located along a front plane of the header assembly 102. The nozzles of the spray guns 104 are presented to the header slot 204 so as to minimize the buildup of residue.

Figure 2A:
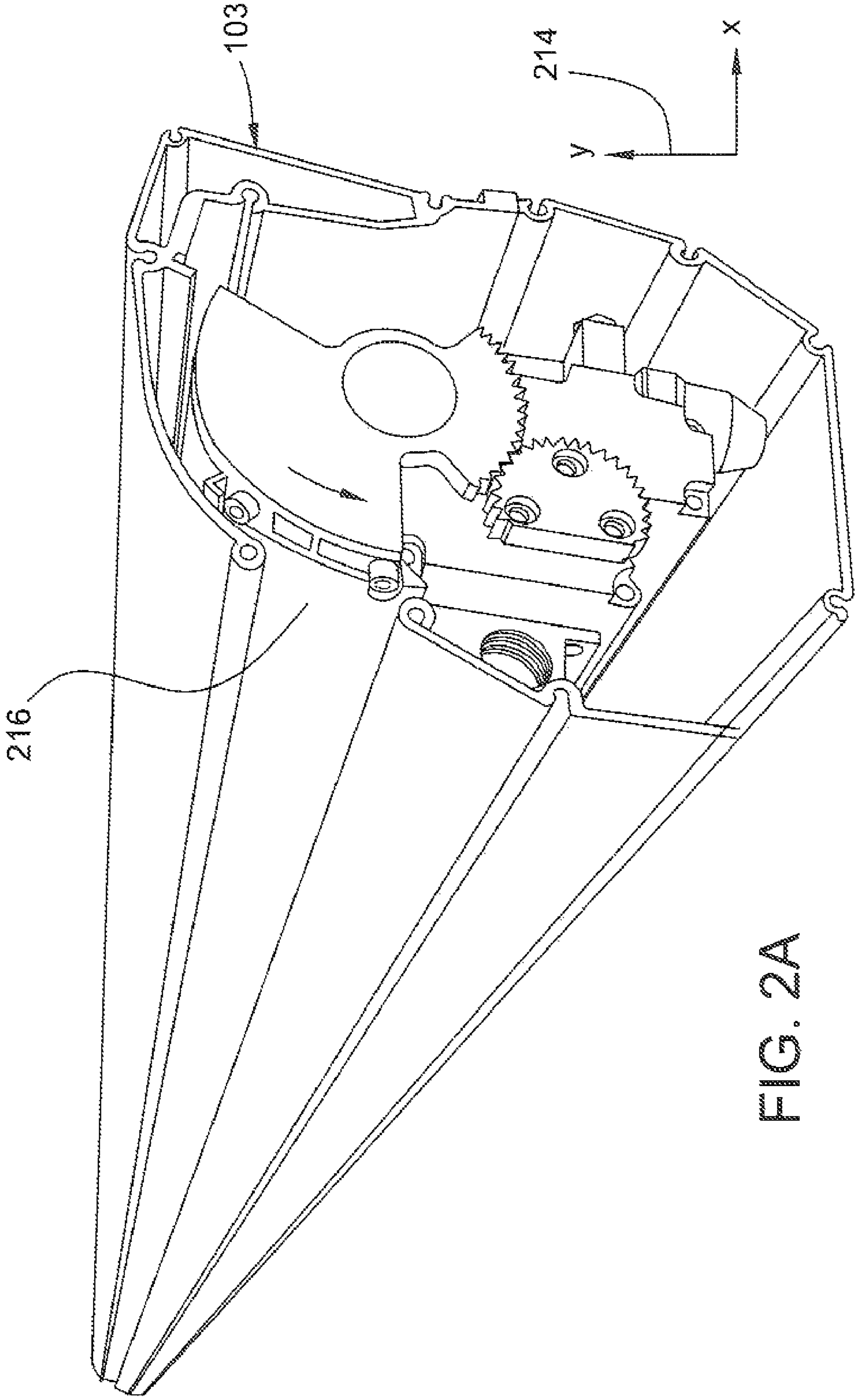
FIG. 2*a* is a further cut away perspective end view of a self cleaning header assembly in accordance with an embodiment of the invention.

In order to clean the exterior surface of the spray gun nozzles 208, the manifold is rotated clockwise via a set of gears 210, 212 into a washdown position 214, wherein the nozzles 208 of the spray guns 104 point to the upper cover of the header assembly 102 (along the rotated y-axis in position 214) to face one or more external wash nozzles 108 (shown in FIG. 5) that are rigidly mounted on the upper cover of the header assembly 102. As shown in FIG. 2A, when the manifold 200 rotates clockwise into the washdown position 214, a shutter 216 moves counterclockwise to close the space defined by the header slot 204.

In order to clean the exterior surface of the spray gun nozzles 208, the manifold is rotated clockwise via a set of gears 210, 212 into a washdown position 214, wherein the nozzles 208 of the spray guns 104 point to the upper cover of the header assembly 102 (along the rotated y-axis in position 214) to face one or more external wash nozzles 108 (shown in FIG. 5) that are rigidly mounted on the upper cover of the header assembly 102. As shown in FIG. 2A, when the manifold 200 rotates clockwise into the washdown position 214, a shutter 216 moves counterclockwise to close the space defined by the header slot 204.

Figure 3:
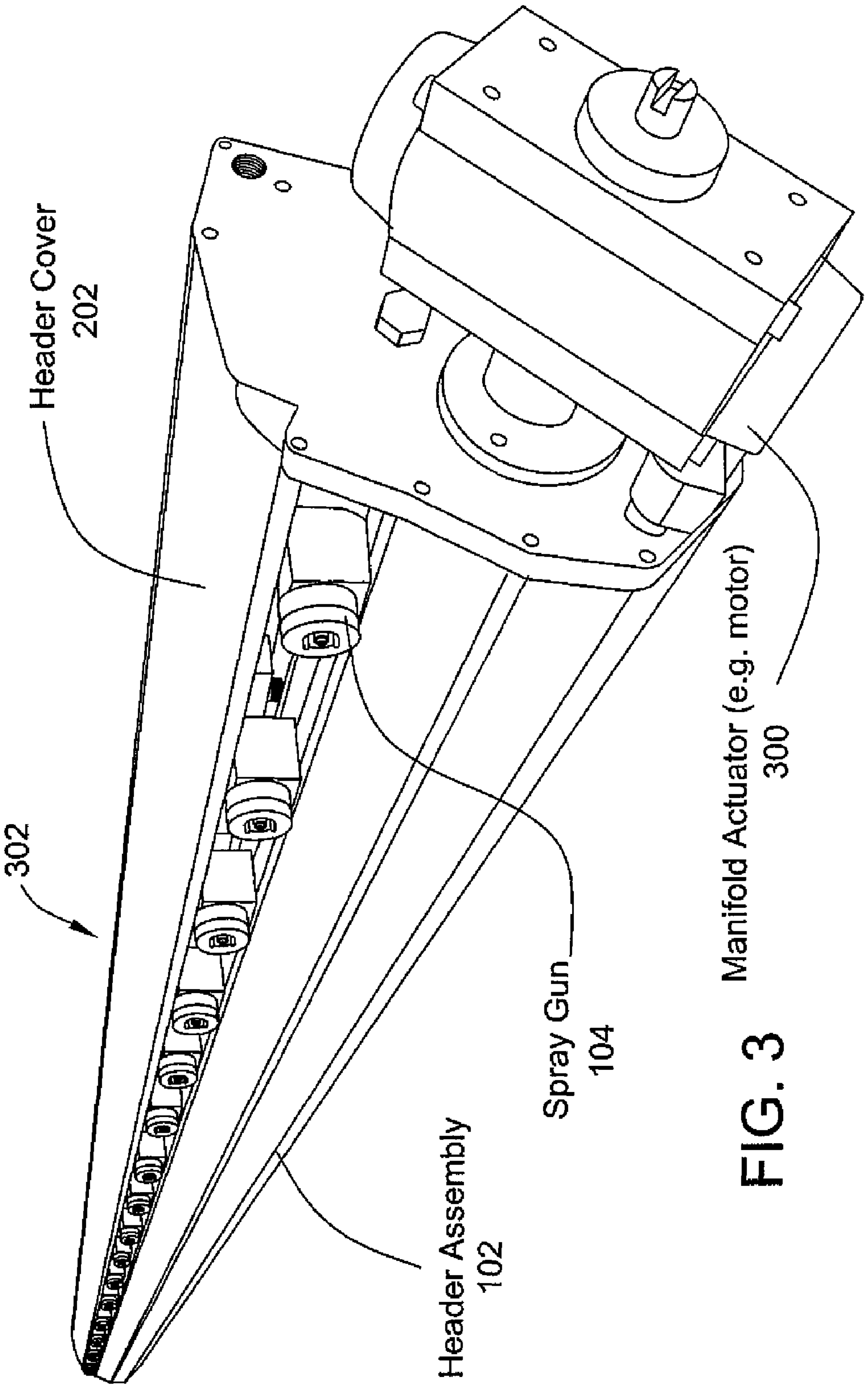
FIG. 3 is a perspective end view of a self cleaning header housing in accordance with an embodiment of the invention.
Figure 3A:
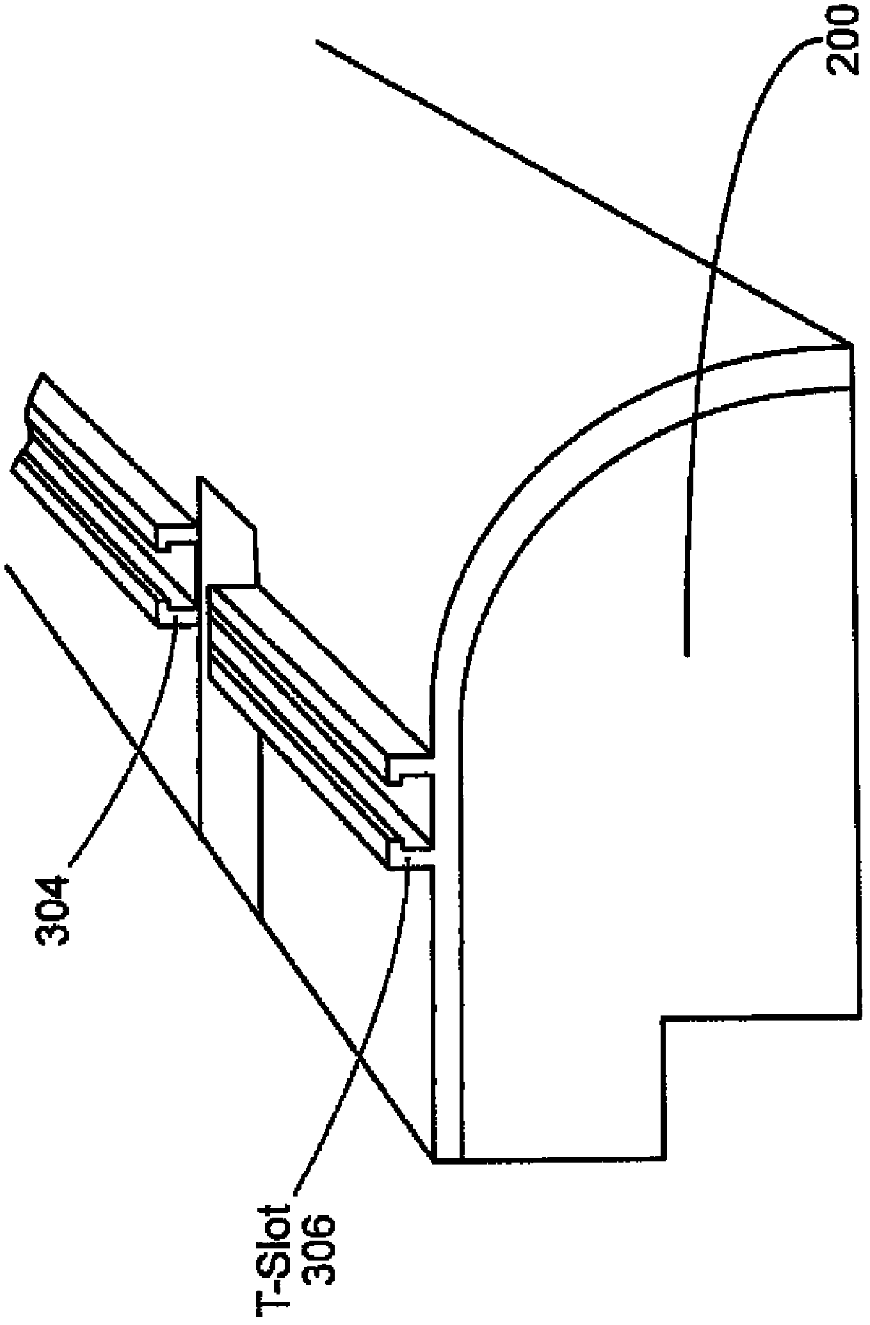
FIG. 3*a* is a schematic perspective end view of a mounting system in accordance with an embodiment of the invention.

Labyrinthine design of the header assembly 102 prevents dripping during washdown (i.e., when the manifold 200 is in position 214 facing external wash nozzles 108) without the need for seals. The header assembly 102 is designed such that the spray guns 104 can rotate and shutter 216 can be closed without changing the side footprint of the overall assembly. This eliminates mechanical interference with the web during washdown. In one embodiment, the components of the header assembly 102 and manifold 200 are made from extruded metal and can be cut to various lengths for custom installations. As shown in FIG. 3A, a T-slot 304 in top of manifold 200 allows attachment of spray guns 104 from above the manifold, while screw bosses and extrusions open away from wetted areas to minimize potential for leaks. To simplify the manufacturing process and to minimize external tubing and fittings, the water passage for external wash nozzles 108 is incorporated into the upper extrusion. Furthermore, the upper extrusion is easily removable when access to the spray guns 104 is needed. To this end, spray guns 104 are attached to the manifold 200 with clamps and T-nuts to facilitate removal from above the manifold. The fluid connections to the extruded manifold 200 are bolted onto the manifold and can be positioned anywhere. Preferably, the fluid connections are reversible so that they could be plumbed from either side of the manifold.

Figure 4:
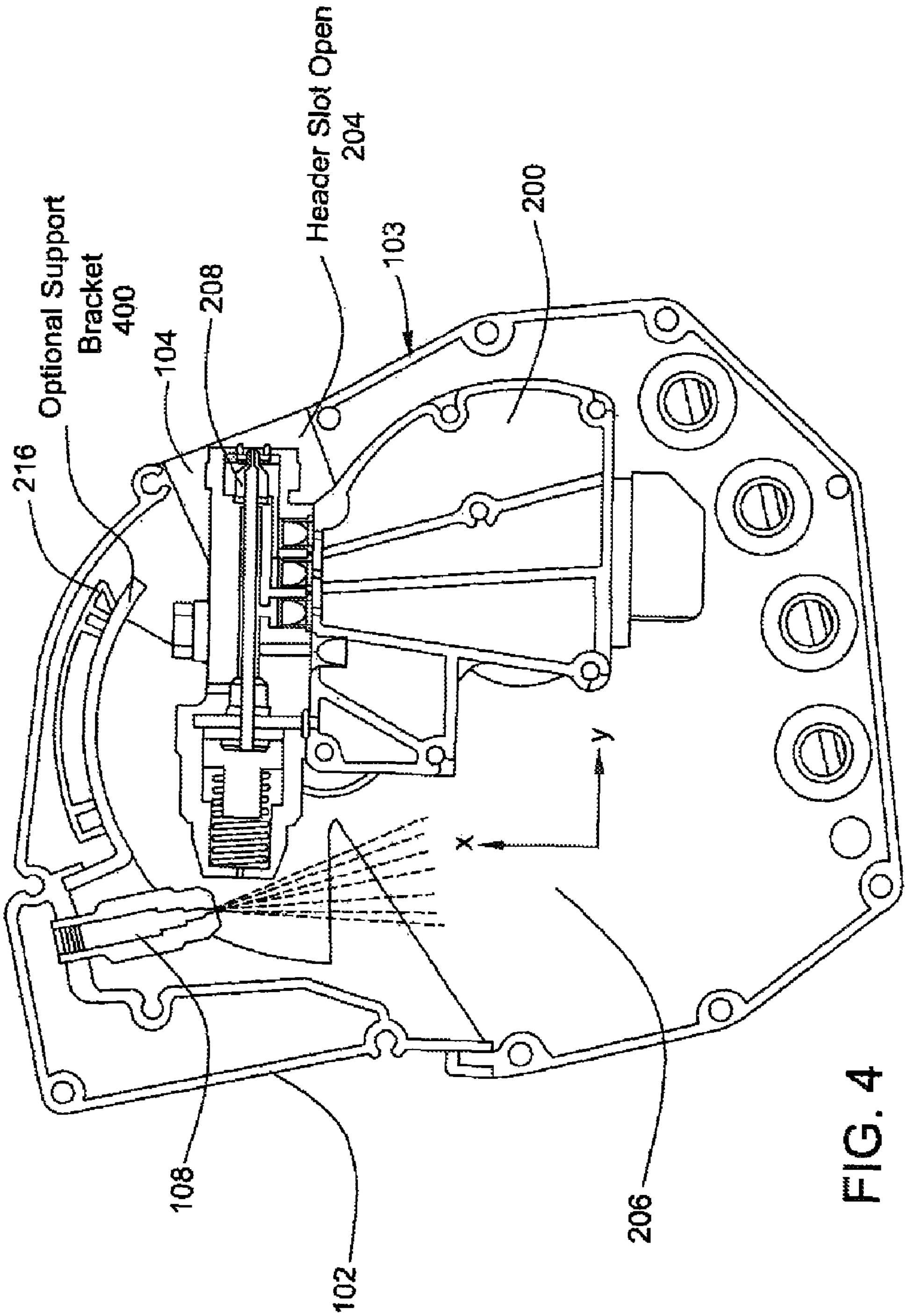
FIG. 4 is a cross-sectional end view of a self cleaning header assembly in accordance with an embodiment of the invention.
Figure 5:
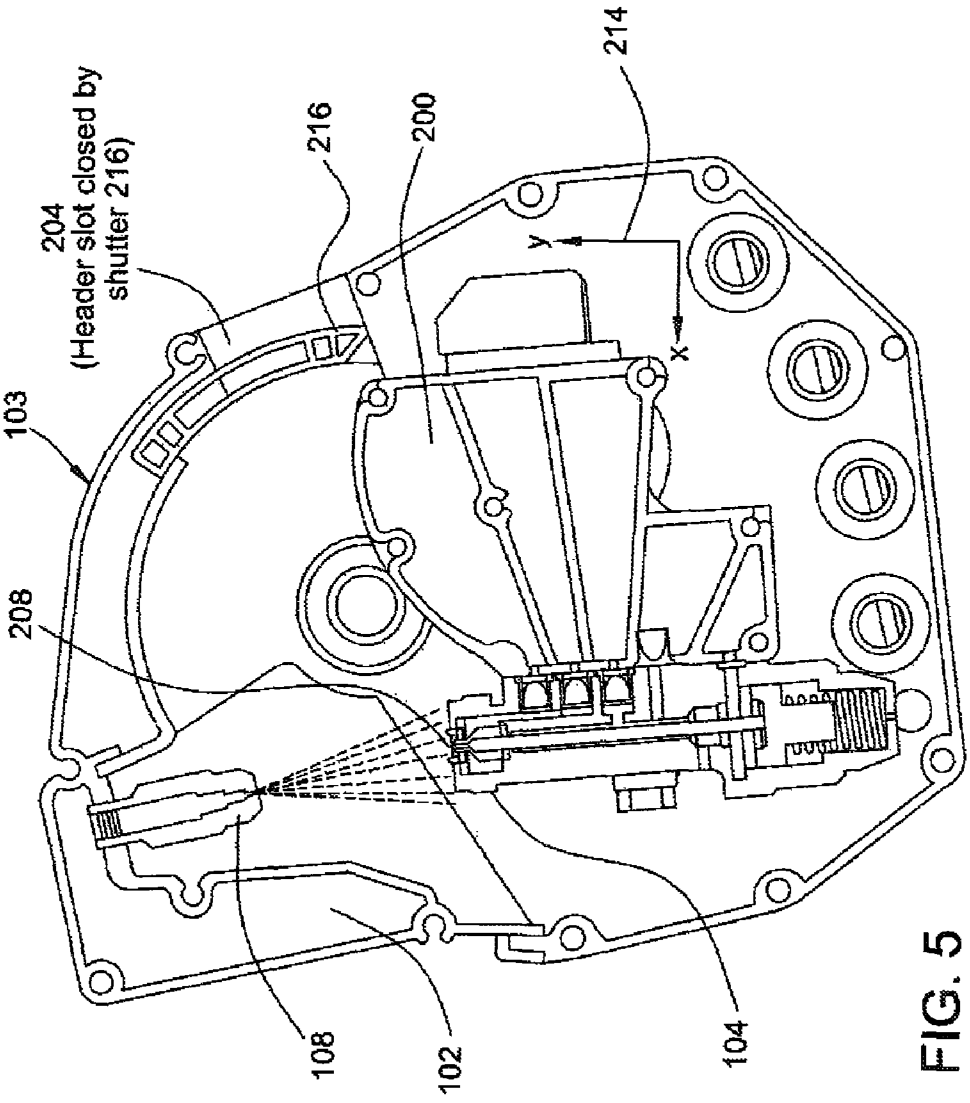
FIG. 5 is a further cross-sectional end view of a self cleaning header assembly in accordance with an embodiment of the invention.

FIGS. 4 and 5 illustrate cross-sectional views of the header assembly 102, manifold 200, and spray gun 104 when the manifold 200 is in the active position 206 (FIG. 4) and washdown position 214 (FIG. 5) respectively. As shown in FIG. 4, when the manifold 200 is in the active position 206, the nozzle 208 of the spray gun 104 is able to disperse the atomized mix through the open header slot 204 because the shutter 216 is open and the nozzle 208 is facing the slot opening. Optionally, the shutter 216 is supported by a shutter bracket 400 for ensuring a rigidity of the shutter 216 along the length of the header assembly 102. As shown in FIG. 5, when the rotary actuator 300 is activated (e.g., on-demand or during predetermined maintenance periods), the shutter 216 closes the slot opening 204 and the manifold 200 moves into a washdown position 214 where the nozzle 208 of the spray gun 104 is facing the external wash nozzle 108. At this time, the external wash nozzle 108 is activated to remove the residue buildup from the exterior of the spray gun 104, including its nozzle 208.

Figure 6:
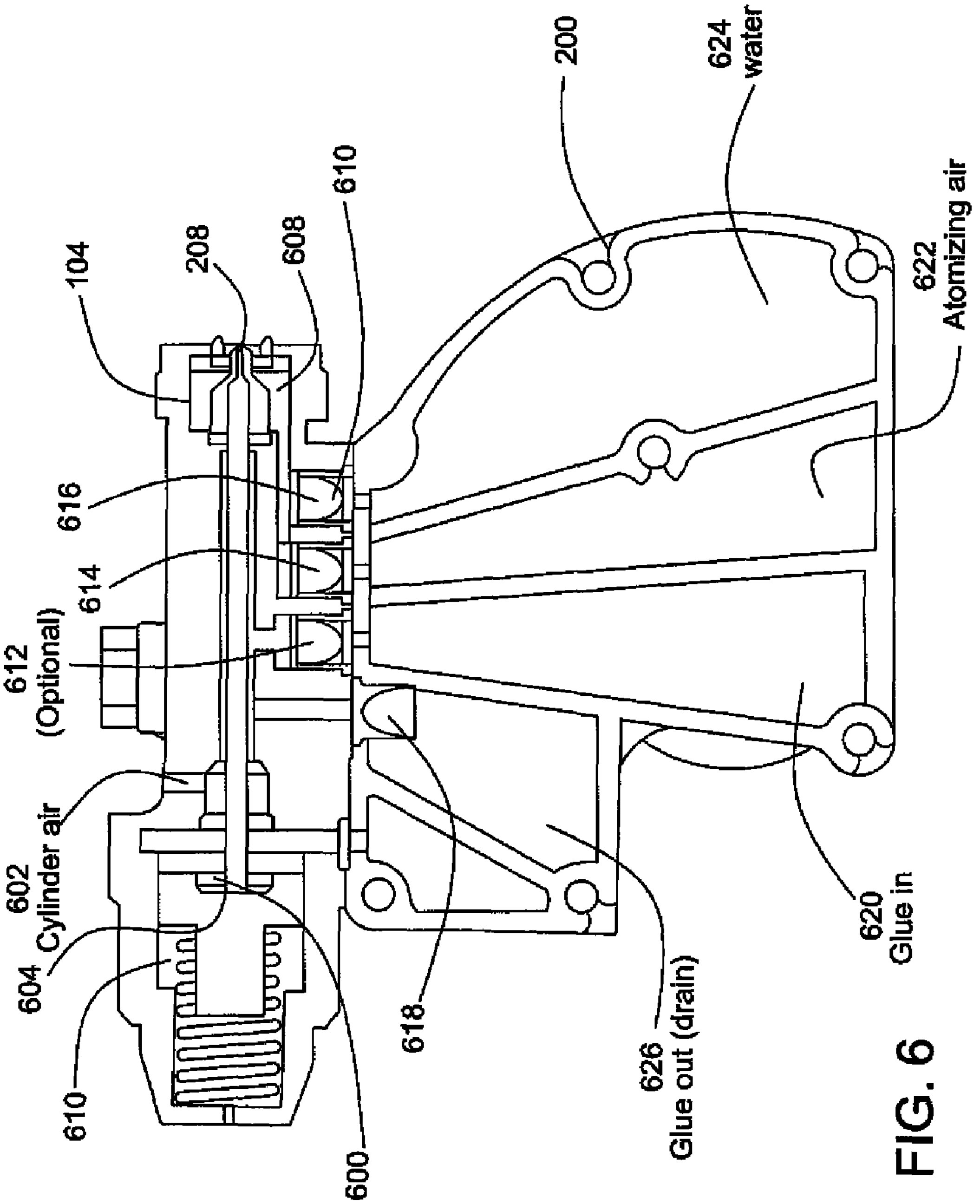
FIG. 6 is a cross-sectional of a spray gun assembly in accordance with an embodiment of the invention.

Turning to FIG. 6, a cross-sectional view of the manifold 200 and spray gun 104 is shown in further detail. In a conventional manner, the spray gun 104 begins spraying when the needle valve 600 moves back responsive to the cylinder air being pumped in via the cylinder air input 602 to cause the piston 604 to compress the cylinder 606. Preferably, the internal air passages 608 are rinsed from a separate water port 610 in the gun body in order to force any accidental adhesive out of the air passages. Duckbill check valves 612-616 incorporated into the gun body prevent air, water and adhesive from contaminating the other passages in the supply manifold and act as the face seal for the adhesive in, atomizing air, and wash water passages 620-624. Duckbill check valve 618 is used to prevent any contamination from the adhesive return passage 626 in the manifold body. However, in an embodiment of the invention, the check valve 618 is omitted.

Manifold passages 602, 620, 622, 624, and 626 accommodate cylinder air, adhesive in, atomizing air, internal water flush, and adhesive return respectively. Manifold passages 602, 620-626 provide a linear arrangement of fluid/air passages in the spray gun 104.

It will be appreciated that the foregoing description provides examples of the disclosed system and process. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A self cleaning header assembly for use in spraying an adhesive comprising:

a header housing;

a plurality of spray guns mounted within said header housing for spraying a mix of air and liquid, said spray guns having an exterior surface, an interior cavity, and a spray nozzle, said spray guns further each having an internal wash passageway for cleaning the spray gun interior cavity;

one or more external wash nozzles fixedly mounted within said header housing for receiving wash water and for cleaning the spray nozzles;

at least one air inlet for receiving atomizing air and cylinder air for said spray guns;

at least one adhesive supply inlet for receiving adhesive to be supplied to the spray guns during spraying;

at least one water supply inlet for receiving water to be supplied to the spray guns and the one or more external wash nozzles, and said plurality of spray guns each being mounted in said header housing for rotation relative to said header housing while said header housing remains in a fixed position for movement within said header housing between a spray position in which the spray gun nozzles are presented to a target surface to be sprayed and a cleaning position in which the spray gun nozzles are rotated away from the target surface and towards said wash nozzles such that the direction of water from said wash nozzles cleans the spray gun spray nozzles.

2. The self cleaning header assembly according to claim 1, wherein the header assembly constitutes a portion of a paper manufacturing processing line.

3. The self cleaning header assembly according to claim 1 in which said header housing comprises, a manifold to which the plurality of spray guns are mounted.

4. The self cleaning header assembly according to claim 3, wherein the manifold is enshrouded by a header cover for protecting the plurality of spray guns.

5. The self cleaning header assembly according to claim 4, wherein the header cover includes a header slot through which the plurality of spray guns disperse an atomized mix of air adhesive when the plurality of spray guns are in the spray position, and wherein the header slot is closed when the plurality of spray guns are in the cleaning position.

6. The self cleaning header assembly according to claim 5, wherein the header cover and spray guns are mechanically linked so that rotation of the spray gun causes rotation of at least a portion of the header cover.

7. The self cleaning header assembly according to claim 6, wherein the portion of the header cover is a shutter movable to close and open the header slot.

8. The self cleaning header assembly according to claim 5, wherein rotation of the plurality of spray guns from the spray position to the wash position increases the proximity of the spray nozzles to the wash nozzles.

9. The self cleaning header assembly according to claim 5, wherein rotation of the plurality of spray guns is caused by rotation of the manifold.

10. The self cleaning header assembly according to claim 5, wherein the header assembly is configured in a labyrinthine arrangement to prevent dripping during washing without a need for seals relative to the header cover.

11. The self cleaning header assembly according to claim 5, wherein spray gun comprises one or more check valve to prevent air and water from contaminating other portions of the supply manifold.

12. The self cleaning header assembly according to claim 11, wherein the one or more check valve provide respective face seals for the air inlet and water supply inlet.

13. An adhesive spray application system comprising:

a self cleaning header assembly having a header housing, a plurality of spray guns mounted within said header housing each having a spray nozzle for spraying a mix of air and liquid, a plurality of external wash nozzles fixedly mounted within said header housing for receiving wash water for cleaning the spray nozzles, at least one air inlet for supplying atomizing air to said spray guns, at least one adhesive supply inlet for supplying adhesive to said spray guns, at least one water supply inlet for supplying water to the spray guns and external wash nozzles, and said plurality of spray guns being mounted in said header housing for rotation relative to said header housing while said header housing remains in a fixed position for movement within said header housing between a spray position in which the spray gun nozzles are oriented toward a target surface to be sprayed and a cleaning position in which said spray gun nozzles are oriented away from the target surface and toward said fixedly mounted external wash nozzles such that the direction of water from said external wash nozzles cleans the spray gun spray nozzles.

14. The self cleaning header assembly of claim 13 in which said spray guns each are mounted on a common manifold, and a drive for rotating said manifold and the spray guns mounted thereon between said spray gun spray and cleaning positions.

15. The self cleaning header assembly of claim 14 in which said header housing includes a shutter that is located in an open position when said spray guns are in said spraying position, and said shutter being movable to a closed position for completely closing said spray guns within said header housing when in the spray gun are in the cleaning position.

16. The self cleaning header assembly of claim 14 in which said spray gun nozzles remain within an outer perimeter of said header housing during rotation of said spray guns between said spraying position and said cleaning position.

17. An adhesive spray application system comprising a self cleaning header assembly having a header housing, a plurality of spray guns mounted within said header housing each having a spray nozzle for spraying a mix of air and liquid, a plurality of external wash nozzles mounted within said header housing for receiving wash water for cleaning the spray nozzles, at least one air inlet for supplying atomizing air to said spray guns, at least one adhesive supply inlet for supplying adhesive to said spray guns, at least one water supply inlet for supplying water to the spray guns and external wash nozzles, and said plurality of spray guns and said plurality of external wash nozzles being mounted for rotation relative to each other within said housing while the housing remains in a fixed position for movement between a spray position in which the spray gun nozzles are oriented toward a target surface to be sprayed and a cleaning position in which said spray gun nozzles are oriented away from the target surface and toward said external wash nozzles such that the direction of water from said external wash nozzles cleans the spray gun spray nozzles.

18. The self cleaning header assembly of claim 17 in which said header housing includes a shutter that is located in an open position when said spray guns are in said spraying position, and said shutter being movable to a closed position for completely closing said spray guns within said header housing when in the spray gun are in the cleaning position.

* * * * *